United States Patent [19]

Lankard

[11] 3,986,885
[45] Oct. 19, 1976

[54] FLEXURAL STRENGTH IN FIBER-CONTAINING CONCRETE

[75] Inventor: David R. Lankard, Columbus, Ohio

[73] Assignee: Battelle Development Corporation, Columbus, Ohio

[22] Filed: June 7, 1972

[21] Appl. No.: 260,654

Related U.S. Application Data

[63] Continuation-in-part of Ser. No. 159,721, July 6, 1971, abandoned.

[52] U.S. Cl. .................................................. 106/99
[51] Int. Cl.² ......................................... C04B 7/02
[58] Field of Search ..................................... 106/99

[56] References Cited
UNITED STATES PATENTS

| | | | |
|---|---|---|---|
| 3,429,094 | 2/1969 | Romualdi | 106/99 |
| 3,650,785 | 3/1972 | Ball et al | 106/99 |

Primary Examiner—Delbert E. Gantz
Assistant Examiner—James W. Hellwege
Attorney, Agent, or Firm—Kenneth R. Warburton; Philip M. Dunson

[57] ABSTRACT

A method of making a two-phase material comprising a mix of concrete and fibers of a material having a modulus of elasticity of at least about 20 million psi substantially uniformly distributed therein with an average spacing between fibers of up to about 0.3 inch. The flexural strengths are measured for a plurality of substantially different average bond areas of the fibers per unit area in planes normal to tensile stress in test specimens of the two-phase material, and the fibers are provided and distributed in such quantity in the bulk mix that the average bond area of the fibers intersecting planes normal to the stress at known regions of highest tensile stress is sufficient to provide at least a preselected flexural strength in such regions.

9 Claims, 4 Drawing Figures

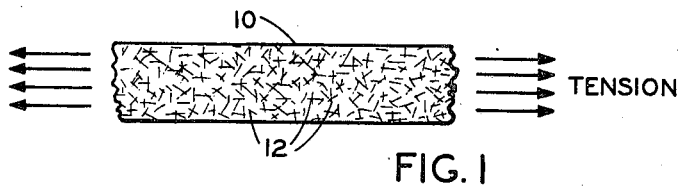

FIG. 1

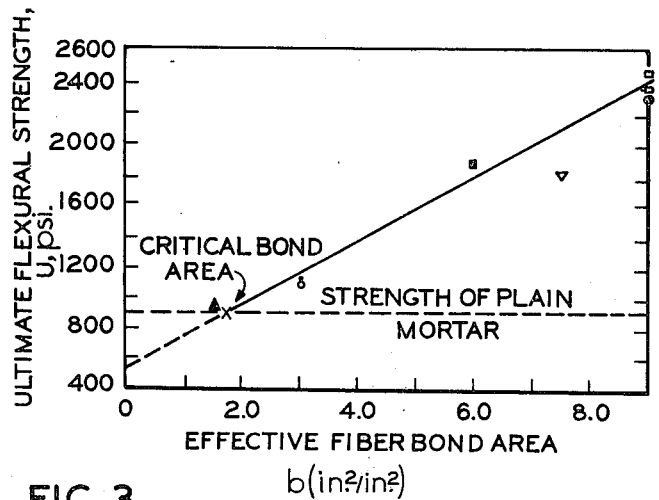

FIG. 2
EFFECT OF FIBER BOND AREA ON
THE ULTIMATE FLEXURAL STRENGTH
OF FIBER-CONTAINING MORTAR
BEAM SPECIMENS (2½ X 3 X 16 in.),
CENTER POINT LOADED.

- A • .010 X 1.0 in., 0.72 V/o
- F ○ .010 X 0.5 in., 1.44 V/o
- B ■ .010 X 1.0 in., 1.44 V/o
- C ▫ .010 X 1.0 in., 2.16 V/o
- G ● .0059 X 0.5 in., 2.36 V/o
- H ▫ .020 X 1.5 in., 2.72 V/o
- I ▲ .010 X 1.0 in., 0.34 V/o
- L ▽ .016 X 1.5 in., 1.94 V/o

FIG. 3
EFFECT OF FIBER BOND AREA ON
THE FIRST CRACK FLEXURAL STRENGTH
OF FIBER-CONTAINING MORTAR
BEAM SPECIMENS (2½ X 3 X 16 in.)

- A • .010 X 1.0 in., 0.72 V/o
- F ○ .010 X 0.5 in., 1.44 V/o
- B ■ .010 X 1.0 in., 1.44 V/o
- C ▫ .010 X 1.0 in., 2.16 V/o
- G ● .0059 X 0.5 in., 2.36 V/o
- H ▫ .020 X 1.5 in., 2.72 V/o
- I ▲ .010 X 1.0 in., 0.34 V/o
- L ▽ .016 X 1.5 in., 1.94 V/o

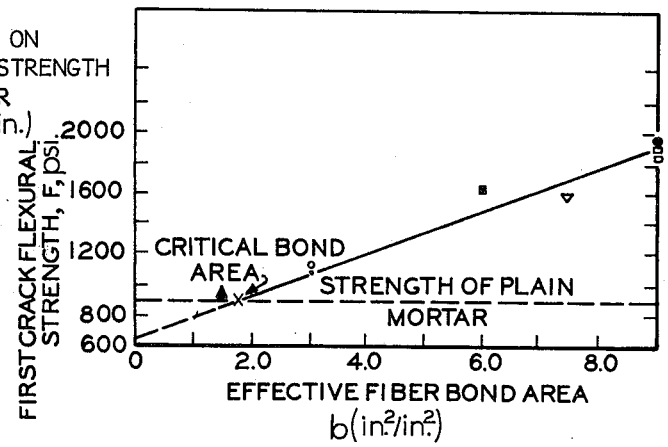

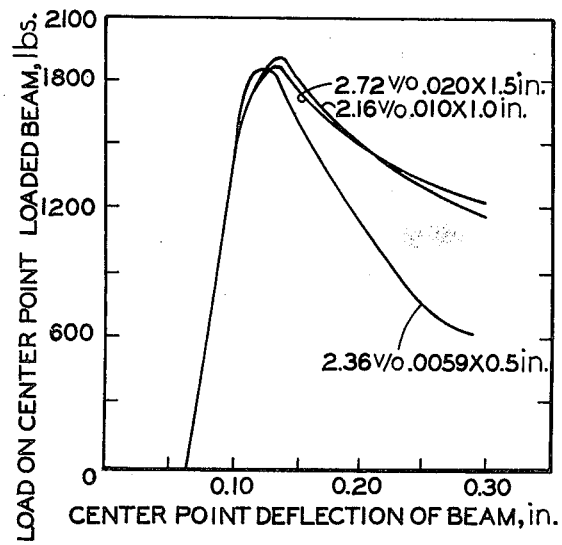

FIG. 4
LOAD-DEFLECTION BEHAVIOR OF
FIBER-CONTAINING MORTAR BEAMS WITH
THE SAME EFFECTIVE FIBER BOND AREA
(b = 9.0 in²/in²)

1

FLEXURAL STRENGTH IN FIBER-CONTAINING CONCRETE

CROSS-REFERENCE TO RELATED APPLICATION

This is a continuation-in-part of my U.S. patent application Ser. No. 159,721, filed July 6, 1971 now abandoned.

BACKGROUND OF THE INVENTION

This invention relates to a method of making a two-phase material comprising small fibers in concrete as in U.S. Pat. No. 3,429,094 of James P. Romualdi. It has to do particularly with improvements for providing such material with at least a preselected flexural strength.

For years, the low tensile strength of concrete has been recognized and has been accepted as an unavoidable limitation to be taken into account in considering applications for concrete. In the past, attempts to compensate for the lack of tensile strength in concrete have usually involved either unstressed or prestressed reinforcing steel rods. Neither really overcomes the low tensile strength limitation, but each merely bypasses it. Thus, concrete reinforced in this conventional manner is characterized by the fact that cracks form and propagate through regions in tension. Such cracks form at relatively low stresses and continue either until they reach a free surface or until they reach a region that is in compression.

Furthermore, the tensile strength exhibited in conventionally reinforced or plain concrete, as determined by standard tests, cannot be relied upon for design purposes since the formation of small incipient cracks due to fatigue, thermal shock or cavities substantially reduces the tensile strength of the concrete. Incipient formation of cracks and subsequent propagation thereof is not always evident, but the conditions favorable for the same cannot be predicted. Even the exercise of exceptionally rigid control procedures does not always minimize crack formation and growth. It has, therefore, long been accepted that about one-half of the material in a normally reinforced concrete beam is useless to resist tensile loads. The detrimental effects of tension cracks in reinforced concrete beams are not limited solely to loss of load-resistant area. For example, it is apparent that tension cracking severely limits the effectiveness of concrete tanks for containing liquids. Also, the use of reinforced concrete in marine structures is sharply curtailed because of the corrosive effect of salt water on reinforcing steel exposed by tension cracks.

The Romualdi invention provides a two-phase material comprising concrete and fine short fibers therein having first crack tensile strength in the order of two to three times that of conventionally reinforced concrete and characterized by substantial resistance to the formation and propogation of tensile or fatigue cracks. The material possesses attributes of an homogeneous material in that it experiences extensive plastic flow without disintegration. It also has the ability to absorb energy more efficiently than conventionally reinforced concrete.

The present invention primarily comprises improved methods of providing at least a preselected flexural strength in two-phase material of the Romualdi type by including and distributing fibers in a concrete mix in specific sizes and quantities to provide certain average bond areas of the fibers intersecting planes normal to the stress at known regions of highest tensile stress. It has been found as a part of the present invention that the first crack flexural strength and the ultimate flexural strength in such materials depend upon such average bond areas and that substantial improvements are obtained by appropriately controlling the sizes and quantities of the fibers as hereinafter disclosed. The bond area of each fiber is approximately equal to the perimeter of its cross section multiplied by its length.

SUMMARY OF THE INVENTION

In a method of making a two-phase material that comprises preparing a concrete mix with fibers of a material having a modulus of elasticity of at least about 20 million psi substantially uniformly distributed therein with an average spacing between fibers of up to about 0.3 inch, a typical form of the present invention comprises the improvement of providing the two-phase material with at least a preselected flexural strength by including and distributing the fibers in the mix in the specific quantity that the ratio, $b$, of (1) average bond area of the fibers intersecting planes normal to the stress at known regions of highest tensile stress, to (2) the area of the planes, is at least a predetermined value sufficient to provide the preselected flexural strength in such regions.

The ratio, $b$, desirably is at least about $$\frac{1}{C}(U - U_o)$$

where
 $U$ = the preselected ultimate flexural strength in said regions,
 $U_o$ = the U intercept of an extension of a straight line plotting measured values of U's versus $b$'s, and
 $C$ = the slope of said line;
the values of $U_o$ and C typically having been determined by measuring the ultimate flexural strengths for a plurality of substantially different values of the ratio, $b$, in test specimens of the two-phase material, plotting the improved values of U as a linear function of $b$ in rectangular coordinates, extending the plotted line to intercept the U axis to obtain $U_o$, and measuring the slope of the line to obtain C.

The ratio, $b$, also may be at least about $$\frac{1}{C}(F - f_o)$$

where
 $F$ = the preselected first crack flexural strength in said regions,
 $f_o$ = the F intercept of an extension of a straight line plotting measured values of F's versus $b$'s, and
 $C$ = the slope of said line;
the values of $f_o$ and C typically having been determined by measuring the first crack flexural strengths for a plurality of substantially different values of the ratio, $b$, in test specimens of the two-phase material, plotting the improved values of F as a linear function of $b$ in rectangular coordinates, extending the plotted line to intercept the F axis to obtain $f_o$, and measuring the slope of the line to obtain C.

Thus, a typical method of making a two-phase material comprising a mix of concrete and fibers or a material having a modulus of elasticity of at least about 20 million psi substantially uniformly distributed therein with an average spacing between fibers of up to about 0.3 inch according to this invention comprises the steps of measuring the flexural strengths for a plurality of substantially different average bond areas of the fibers per unit area in planes normal to tensile stress in test specimens of the two-phase material, and providing and distributing the fibers in such quantity in the bulk mix that the average bond area of the fibers intersecting planes normal to the stress at known regions of highest tensile stress is sufficient to provide at least a preselected flexural strength in such regions.

The fibers typically are about $2.5 \times 10^{-5}$ to $3 \times 10^{-3}$ square inch in cross-sectional area and about ¼ to 3 inches long, and the average length is about 40 to 300 (preferably about 150 to 300) times the square root of the cross-sectional area, and preferably at least about one inch. With fibers of a given length and of a selected material and shape available in a plurality of cross-sectional areas, the fibers used preferably have the cross-sectional area for which the product of the cost per unit weight times the square root of the cross-sectional area is least.

BRIEF DESCRIPTION OF THE DRAWING

FIG. 1 is a longitudinal sectional view of a portion of a beam of two-phase material as made by a method of the present invention.

FIG. 2 is a graph in rectangular coordinates of ultimate flexural strength, U, against average fiber bond area per unit area, b, in a beam as in FIG. 1.

FIG. 3 is a graph in rectangular coordinates of first crack flexural strength, F, against average fiber bond area per unit area, b, in a beam as in FIG. 1.

FIG. 4 is a graph showing load-deflection behavior in beams as in FIG. 1 where the fibers distributed therein have the same average bond area but a different length and diameter in each beam.

DESCRIPTION OF PREFERRED EMBODIMENTS

In general, this invention comprises a method of making a two-phase material comprising concrete with fibers, such as wires, of a material having a modulus of elasticity of at least about 20 million pounds per square inch (psi) substantially uniformly distributed therein with an average spacing between fibers (that is between their axes) of up to about 0.3 inch. The fibers provide a crack arrest mechanism that increases cracking strength and provides toughness to a degree heretofore unobtainable by other means in conventional concrete.

The material typically is prepared by mixing given proportions of short pieces of wire directly with cement, sand, and water.

In FIG. 1 a longitudinal section through a concrete beam 10 in tension is shown with short randomly oriented fibers 12 therein. The beam 10 can be prepared by first mixing sand, cement, and water in a mixer and subsequently adding fibers thereto. Because individual fibers may have a tendency to "ball-up", it is sometimes desirable to project them into the rotary drum by means of a suitable blowing mechanism. After the fibers are in the mix, more water may be added as required. Care should be exercised in adjusting the water/cement ratio. Where the mixture is either too wet or too dry, there is a tendency for knitting of some fiber types into balls. The correct water/cement ratio is determined by visual observation of the mass undergoing mixing. It has also been observed, that at the higher ratios of length to diameter, there is a greater tendency for knitting of individual fibers during mixing. In addition to cement, sand, and water, the concrete mix may also include coarse aggregate in which the pieces may have dimensions greater than 0.3 inch. When coarse aggregate is used, the volume percent of the fibers should be such that the average spacing between them in the sand, cement, and water portion occupying the interstices between the coarse aggregate is not more than 0.3 inch.

It is postulated that the surprising improvement in cracking strength provided by the two-phase concrete material according to this invention results from a two-phase behavior at the critical fiber spacings. To better understand this behavior, it is necessary to consider the behavior of concrete subjected to tensile stress. As concrete is subjected to tensile stress, one of the many flaws inherent in the material will enlarge to a crack which will propagate throughout the tensile zone, thus resulting in failure of the member. It is believed that at the critical fiber spacings described herein, displacements developing in the material ahead of the crack edge are reacted on by the fiber thereby producing a force on the matrix sufficient to prevent stretching of the concrete in the immediate vicinity of the flaw. An individual fiber can only extend a small amount, if at all, to prevent relief of resisting forces holding the flaw together. Crimped wires or other wavy configurations used to reinforce concrete structures in the past are not essential to the practice of this invention and would in fact be considerably less efficient than the substantially straight fibers that are preferred. Also, fibers of a material having a modulus of elasticity less than about 20 million psi would not be effective, because the crack arrestor must have considerably greater stiffness than the matrix. Because the strength of concrete is related to the size of internal flaws inherent therein, the smaller the spacing between fibers, and consequently the smaller the allowable flaw, the greater is the tensile strength that can be achieved.

The material of the Romualdi patent comprises a wholly new form of concrete material. The nature of this new material and the unique two-phase behavior resulting therein at critical spacings of the fibers can best be understood by comparison with conventional reinforced concrete wherein a variety of sizes and shapes of reinforcement have been provided in the prior art. The distinctive properties of the former material results from the wholly different functions performed by the reinforcing elements in each case. In conventional reinforced concrete, regardless of the size and shape of the reinforcement, the ultimate load bearing capacity of the structure is improved. This means that the structure will hold together after the first crack, but the first crack still appears at about the same bending moment as in a plain concrete beam of the same dimensions. Heavy steel reinforcing bars act to carry the tensile load in conventionally reinforced concrete following cracking. Short wavy or otherwise irregular configurations of the prior art may be provided to hold togther cracked concrete by virtue of their configuration. In the Romualdi invention, substantially straight fibers having a high modulus of elasticity are added to concrete in a manner so as to be below a critical maximum spacing below which there is an increase in the tensile and flexural strength or cracking resistance of the concrete. Thus, the full tensile strength of fiber-containing concrete can be relied on for design purposes and the influence of corrosive environments in practice are minimized. Following formation of the first visible crack in the Romualdi material (at the tensile strength), its behavior further deviates from that of reinforced concrete. In the latter, brittle behavior prevails and cracks propagate freely with little resistance until the reinforcement pulls out (at the ultimate strength). In the present material, a large amount of energy is needed to propagate a crack from fiber to fiber and the material is stable in the presence of cracks as in a ductile material. Both materials have a higher ultimate strength than unreinforced concrete. The outstanding characteristic of conventionally reinforced concrete lies in this higher ultimate strength. The cracking strength of the aforementioned reinforced concrete does not differ from that of plain unreinforced concrete and it also remains brittle. The uniqueness of the present concrete lies in its ability to demonstrate a much greater cracking strength than conventionally reinforced concrete together with ductility.

Although the fibers may be placed in a variety of positions, the essential element in the practice of the Romualdi invention is the provision of the critical spacing. He discovered that a vastly improved concrete material having exceptional cracking strength is provided when the average spacing between randomly oriented fibers is less than 0.5 inches. This appears to be a threshold value and the increases of cracking strength become greatest when the average spacing between wires is reduced to below 0.3 inch.

A mathematical derivation can be made to describe the spatial relationship of randomly oriented fibers. Although numerous manners of calculation may be employed to describe these relationships, it has been found that a rule of thumb calculation to determine the volume percent of fiber needed to achieve a particular average spacing of short fibers is provided by the formula:

$$S = \frac{13.8d}{\sqrt{P}}$$

where $S$ = average spacing in a uniform distribution of short fibers, in inches $d$ = average diameter of the fibers, in inches $P$ = percent, by volume, of fibers in the mix.

For example, to attain an average spacing between fibers of not greater than 0.3 inch, 0.08 volume percent of fiber having a diameter of 0.006 inch or 0.21 volume percent of fiber having a diameter of 0.010 inch would be required.

From the above, it is apparent the smaller diameter fibers are more favorable to achieve the spacing of crack arrestors according to the Romualdi invention within practical limits of volume percent of fibers in the mix. Generally, it has been found that for a given volume percent higher ratios of length to diameter provide somewhat better cracking strength and improved ultimate strength. For a given diameter and volume percent of fibers, greater length (e.g., 1½ inches v. ½ inch in a 2 × 2 × 12 inch beam) gives a less random distribution of the fibers and favors their orientation in the direction of principal tensile stress. The two-phase materials having crack arrestors of higher length to diameter ratio have higher ultimate strength because they have more suitable characteristics that favor carrying a tensile load.

Details of the improved methods of the present invention and the superior results and savings that may be achieved are brought out in the following examples.

EXAMPLES

All specimens were made using a mortar formulation consisting of 1.0 part cement to 2.4 parts of concrete sand at a water-cement ratio of 0.45. The cement was from a single lot of Type I Portland cement. The washed glacial sand used was also from a single lot and had a fineness modulus of 3.0, a specific gravity (SSD) of 2.59, and an absorption of 2.65 percent.

All wire fiber used was from a single lot of high carbon steel having a modulus of elasticity of about 29 million psi. Eight 1.5 ft.$^3$ batches were prepared as follows:

1. The mortar (sand, cement, water was prepared) in a 3.0 ft.$^3$ drum-type mixer.

2. Thirty pounds of mortar were taken from the batch and used in the determination of mortar unit weight and in the preparation of three beam specimens (2.5 × 3.0 × 16.0 inches).

3. Steel fiber in the desired quantity was added to the remaining mortar by hand dispersing the fiber into the rotating mixer. After all the fiber had been added, mixing was continued until a uniform dispersion was achieved.

4. Ten beam specimens (2.5 × 3.0 × 16.0 inches) were made from the fiber containing mix. Each beam was prepared from individually weighed quantities of mix so as to achieve exactly the same amount of material in each beam. Light external vibration (60 cps) was used in the preparation of all specimens. (Including the plain mortar specimens).

5. Two beams from each batch were dumped on a 0.25-inch sieve shortly after casting (before any set occurred), and the mortar was washed away to determine the actual amount of fiber in each beam relative to that computed (fiber washout study).

6. The entrapped air content of the mix after addition of the steel fiber was determined using the pressure method (ASTM C231).

7. All specimens were cured in the molds in fog at 73° F for 24 hours.

8. After demolding, the beam specimens were cured in low pressure steam (140° F) for 7 days prior to study.

A complete description of the batches prepared in the study and the properties and other pertinent information on the fresh mixes are presented in Table 1.

Flexural strength measurements were made on the beam specimens using the center-point-loading technique on a span of 15 inches. The long span was chosen to magnify the deflection of the steel-fiber containing specimens during loading. All measurements were made using a 60,000 lb. capacity Baldwin Universal Testing Machine and a loading rate of 0.04 inches per minute. Complete load-deflection records were obtained for each specimen tested (deflection recorded autographically as platen head travel).

Data obtained on the first-crack and ultimate flexural strength of the beams are presented in Table 2 and shown graphically in FIGS. 2 and 3. From the figures, it is seen that a linear relationship exists between ultimate flexural strength, U, and the effective fiber bond area and between first-crack flexural strength, F, and effective fiber bond area.

The plots of U vs. $b$ do not extrapolate back through the strength of the plain mortar. For the conditions of the present investigation, it is indicated that fiber additions resulting in effective fiber bond areas less than about 1.8-in²/in² would provide no improvement in either U or F over the plain mortar.

The load-deflection behavior of fiber-containing beams having the same calculated fiber bond area was similar for deflections up to the deflection at ultimate flexural strength (as witness the same F and U for beams with equal $b$) independent of the type of fiber used. The post ultimate load-deflection behavior, however, was influenced by the length of the fibers as shown in FIG. 4. Logically, the rate of load ($\sigma$) decrease with increasing deflection ($\epsilon$) after ultimate has been exceeded ($d\sigma/d\epsilon$) should be proportional to the rate of decrease of effective fiber bond area ($b$) with increasing deflection ($-db/d\epsilon$). Thus, the rate of falloff of load after ultimate should increase as fiber length is decreased (assuming constant diameter and $v/o$). For the mixes shown in FIG. 4, it is expected that the highest $db/d\epsilon$ should be exhibited by the mix containing 0.5 inch long 0.006 inch diameter fibers.

$A$ = surface area of a fiber of length, $x$, and diameter, $D$, in²
$B$ = effective fiber bond area, in² and
$n = N/S$
$A = \pi D x$ (neglecting ends of fibers)
where
$N$ = total number of fibers in specimen = $W/w$
$S$ = fiber subunits in specimen = $L/x$ (dimensionless)
$D$ = diameter of fiber, in
$x$ = length of fiber, in
$w$ = weight of one fiber of length, $x$, and diameter, $D$, gms
$L$ = length of beam specimen, in
$W$ = total weight of fibers in beam specimen, gms
Substituting in Equation 1 gives $$B = \left\{\frac{W/w}{L/x}\right\} \left\{\pi D x\right\} = \pi D x^2 \frac{W}{Lw} \quad (2)$$

Expressing B in terms of in² of fiber bond area per in² of fracture surface, Equation 2 becomes

TABLE 1

BATCH IDENTIFICATION AND PROPERTIES OF FRESH FIBER-CONTAINING MORTAR BATCHES

| Batch Identi-fica-tion | Fiber Parameters | | | Calculated Effective Fiber Bond Area, in²/in² | Unit Weight of Mortar Without Fiber lb/ft³ | Air Content of Mortar With Fiber Volume percent | Fiber Washout, gms. | | |
|---|---|---|---|---|---|---|---|---|---|
| | Dia. inch | Length inch | Quantity Volume percent | | | | Measured Beam No. 1 | Measured Beam No. 2 | Calculated |
| A | 0.010 | 1.0 | 0.72 | 3.0 | 137.3 | 4.6 | 122 | 108 | 111 |
| B | 0.010 | 1.0 | 1.44 | 6.0 | 137.8 | 5.0 | 225 | 246 | 222 |
| C | 0.010 | 1.0 | 2.16 | 9.0 | 137.1 | 5.3 | 301 | 374 | 333 |
| F | 0.010 | 0.5 | 1.46 | 3.0 | 135.6 | 5.2 | 237 | 236 | 222 |
| G | 0.0059 | 0.5 | 2.36 | 9.0 | 136.1 | 4.8 | 3.9 | 404 | 364 |
| H | 0.020 | 1.5 | 2.72 | 9.0 | 137.8 | 4.2 | 429 | 431 | 420 |
| I | 0.010 | 1.0 | 0.34 | 1.5 | 137.0 | 4.7 | 59 | 56 | 55 |
| L | 0.016 | 1.5 | 1.94 | 7.5 | 136.8 | 4.9 | 349 | 299 | 299 |

TABLE 2

FLEXURAL STRENGTH PROPERTIES OF PLAIN AND FIBER-CONTAINING MORTAR BEAMS

| Batch Identi-fica-tion | Dia. inch | Length inch | Quantity Volume percent | Effective Fiber Bond Area, b, in²/in² | Ultimate Flexural Strength of Mortar psi | Flexural Strength of Fiber Mix, psi | | Ratio of Ultimate to First Crack Strength |
|---|---|---|---|---|---|---|---|---|
| | | | | | | First Crack | Ultimate | |
| A | .010 | 1.0 | 0.72 | 3.0 | 890 | 1100 | 1140 | 1.03 |
| F | .010 | 0.5 | 1.44 | 3.0 | 905 | 1115 | 1130 | 1.01 |
| B | .010 | 1.0 | 1.44 | 6.0 | 970 | 1630 | 1925 | 1.18 |
| C | .010 | 1.0 | 2.16 | 9.0 | 975 | 1845 | 2410 | 1.31 |
| G | .0059 | 0.5 | 2.36 | 9.0 | 920 | 1970 | 2350 | 1.20 |
| H | .020 | 1.5 | 2.72 | 9.0 | 860 | 1920 | 2510 | 1.31 |
| I | .010 | 1.0 | 0.34 | 1.5 | 895 | 940 | 940 | 1.00 |
| L | .016 | 1.5 | 1.94 | 7.5 | 820 | 1590 | 1840 | 1.16 |

$$b = \frac{\pi D x^2 W}{Lwa} \quad (3)$$

CALCULATING BOND AREAS

The effective fiber bond area, B, is defined as the surface area along the length of all the fibers contained in the fracture plane of a beam-shaped flexural specimen and may be calculated as follows:

$$B = nA \quad (1)$$

where
$n$ = number of fibers in the fracture plane of a beam in bending where
$a$ = cross-sectional area of fracture surface in beam specimen (in²), and the units for $b$ are in²/in².

DETERMINING PARAMETERS

Referring now to FIG. 2 and the Summary of the Invention above, it is seen that in the examples plotting the improved values of U as a linear function of $b$ in rectangular coordinates yields a line which has a slope $C = 216$ and which extended to intercept the U axis gives $U_o = 520$.

Thus
$$U = 520 + 216b \quad (b > 1.8)$$
from which
$$b = \frac{1}{216}(U - 520).$$
Similarly, from FIG. 3, $f_o = 640$ and $C = 144$.
Thus
$$F = 640 + 144b \quad (b > 1.8)$$
from which
$$b = \frac{1}{144}(f_o - 640).$$

It has been found as a part of the present invention that to provide the improved results of the invention the fibers provided in the concrete mix should have a modulus of elasticity of at least about 20 million psi and that the fibers should be about $2.5 \times 10^{-5}$ to $3 \times 10^{-3}$ square inch in cross-sectional area and about ¼ to 3 inches long, with the average length about 40 to 300 (and preferably about 150 to 300) times the square root of the cross-sectional area. For fibers that are circular in cross section the diameters would be about 6 to 63 mils with average lengths about 30 to 250 (preferably about 125 to 250) times the diameters.

With fibers of a given length and of a selected material and shape (such as circular) available in a plurality of cross-sectional areas (diameters) the fibers used may have any cross-sectional area within the above range, and as is indicated by FIG. 4 the longer such fibers (at least about one inch long) are generally preferable. Within the range, and other parameters being equal, the cost of the fibers can be minimized by selecting the cross-sectional area (diameter) for which the product of the cost per unit weight times the square root of the cross-sectional area (or similarly the product of the cost per unit weight times the diameter) is least. For example, with circular wires of a selected material and length available in two diameters, say 10 mils and 20 mils, two wires each 10 mils in diameter provide the same average bond area as one wire 20 mils in diameter but have only one-half the total cross-sectional area and thus weigh only half as much as the larger wire. Thus, the smaller wire is less expensive to use as long as its cost per unit weight is less than twice the cost per unit weight of the larger wire.

Of course many factors can effect the characteristics of a concrete mix and the possible variations are countless. The present invention can therefore be appropriately defined only in the manner set forth herein, whereby routine preliminary testing in accordance with the present disclosure enables those skilled in the art to practice the invention most effectively to provide substantially improved preselected flexural strengths in fiber-containing concrete materials of the Romualdi type.

Further Examples

Fiber-containing concretes were prepared using a variety of fiber sizes proportioned so as to yield effective fiber bond areas from 1.0 to 6.0 in² per in². The concrete mix used in all the formulations is shown in Table 3.

TABLE 3

CONCRETE MIX USED IN INVESTIGATION OF EFFECTIVE FIBER BOND AREA ON THE FLEXURAL STRENGTH OF FIBER-CONTAINING CONCRETE

| Constituent | lb/yd³ |
|---|---|
| Cement (Portland Type 1) | 846 |
| Sand (SSD)[a] | 1600 |
| No. 8 Aggregate[b] (SSD) | 715 |
| Water[c] | 326 |
| Steel Fibers[d] (variable) | 80 to 344 |

[a]Saturated surface dry condition.
[b]⅜in maximum size
[c]WRDA, a water reducing admixture used at the rate of 7 oz per 100 lb of cement (Type A, ASTM Designation C494)
[d]Modulus of elasticity about 29 million psi.

A total of seven 1.5 ft³ batches were prepared including one plain concrete batch and six fiber-containing concrete batches. Total mixing time was 8 minutes including an initial 3-minute mixing period after all materials had been introduced to the mixer, a 3-minute test period and a final 2-minute mixing period. The slump and unit weight of each batch were determined. Specimens prepared from each batch included five beam specimens (4 × 4 × 14 inches) for flexural strength testing and three cylindrical specimens (4 × 8 inches) for compressive strength measurements.

All specimens were prepared by hand rodding. Following a 24 hour fog room cure (100 percent relative humidity, 73° F) in the mold, the specimens were cured in low pressure steam at 140° F for an additional 7 days (equivalent to 28 days fog room cure).

Flexural strength measurements were made on a 400,000 pound Tinius-Olsen universal testing machine using the third point loading technique on a span of 12 inches.

A description of the plain and fiber-containing concrete batches is presented in Table 4 along with the strength data obtained.

TABLE 4

DESCRIPTION AND PROPERTIES OF EXPERIMENTAL FIBER-CONTAINING CONCRETE BATCHES

| Concrete[a] Identification | Effective Fiber Bond Area b, in²/in² | Fiber Size, Diameter and length, in | Fiber Quantity, Volume Percent | Slump, in | Unit Weight lb/ft³ | Flexural Strength Properties[b], psi First Crack Strength | Flexural Strength Properties[b], psi Ultimate Flexural Strength | Compressive Strength,[c] psi |
|---|---|---|---|---|---|---|---|---|
| A | 0 | — | No fiber plain concrete | 4¼ | 143.0 | 660 | 660 | 7750 |
| B | 2.0 | 0.020 × 1.5 | 0.6 | 4 | 144.5 | 810 | 810 | 7545 |
| I | 3.0 | 0.020 × 1.0 | 1.4 | 1 | 148.8 | 885 | 920 | 7945 |
| G | 4.0 | 0.010 × 1.0 | 0.9 | 1¼ | 147.3 | 940 | 980 | 7635 |
| C | 4.0 | 0.020 × 1.5 | 1.2 | 1½ | 149.8 | 955 | 970 | 8650 |
| H | 5.0 | 0.016 × 1.0 | 1.9 | ½ | 150.5 | 1035 | 1125 | 8000 |
| D | 6.0 | 0.020 × 1.5 | 1.8 | 1½ | 151.5 | 1040 | 1300 | 8590 |

[a]The concrete mix used in all batches described in Table 3. All batches were prepared at a water:cement ratio (by weight) of 0.385
[b]Obtained on 4 × 4 × 14-in beams using third point loading on 12 in span. Average of 5 tests
[c]Obtained on 4 × 8-in cylinders. Average of 3 tests The amount of fiber required to yield the preselected effective fiber bond area was calculated from the relationship, $$W = \frac{bLwa}{\pi D x^2}$$

which results from solving equation (3) for W, and where (as in equation (3))

$W$ is the weight of fibers per beam specimen, gms
$b$ = effective fiber bond area, in²/in²
$L$ = length of beam = 14 in.
$a$ = x-sectional area of beam = 16 in²
$w$ = weight of individual fiber of length x and diameter D, gms
$D$ = fiber diameter, in.
$x$ = fiber length, in.

The strength versus bond area data when plotted on rectangular coordinates as in FIGS. 2 and 3 show similar linear relationships. The equations for the curves plotted from the data in Table 4 are
for ultimate flexural strength $$U = 540 + 120 b \quad (1 \leq b \leq 6)$$

and for first crack flexural strength $$F = 570 + 90 b \quad (1 \leq b \leq 6)$$

The concrete mix used in the further examples contained ⅜-inch maximum size aggregate with accepted ASTM or AASHO gradation. These are the preferred aggregate size and grading.

Larger maximum size aggregate (with grading conforming to accepted standards) can be used in the fiber-containing concrete. However, the maximum amount that can be used without adversely affecting the desired properties of the concrete depends on the overall proportioning of the concrete mix and the size (length and diameter) and quantity of the fibers.

Generally as the ratio of length to diameter (aspect ratio) of the fiber is increased, the amount and maximum size of coarse aggregate in the mix must be reduced in order to maintain desired working, handling, and placing characteristics of the fiber-containing concrete.

Increased quantities of fibers above those providing and effective bond area, $b$, of about 6 in²/in² were not feasible in the concrete mix of Table 3, as the concrete became unworkable and low slump and high porosity were encountered at higher loadings.

The linear relation between strength and fiber content for mortars and other concretes containing fiber has been observed also for concretes containing other fibers of a given length and diameter. In general, as the fiber content is increased, a point is reached where the workability of the mix is greatly reduced as evidenced by a loss of slump of the mix, balling of the fibers, and the failure of the fresh mortar or concrete to penetrate the clumps of the fibers. This situation can adversely affect consolidation of the fresh mix to the point where even prolonged external vibration fails to move the material. Poor consolidation is manifested as a highly porous, honeycombed matrix. The fiber loading at which this situation is reached differs for each fiber type (of a given length and diameter) for a given mortar or other concrete. Another consequence of poor workability is a nonuniform distribution of fibers, both on a specimen-to-specimen basis and within a given specimen. Experience has shown that the fiber loadings at which workability is adversely affected is related to both the diameter and length of the fiber. For a given length of fiber, the smaller the fiber diameter, the lower the fiber content required to decrease workability. With a fiber of given diameter the same holds as the length is increased.

As a general guide, it has been found that any steel fibrous concrete or mortar that does not readily flow under moderate conditions of external vibration does not have adequate workability.

Unless otherwise indicated, the term "bond area" wherever used herein and whether with or without other adjectives, means "effective fiber bond area," B (or $b$ where per unit area), as defined in the section on "Calculating Bond Areas." The equations derived in that section apply specifically to fibers that are circular in cross section. Corresponding equations may be derived similarly for fibers of any other cross-sectional shape such as square, rectangular, elliptical, etc.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. In a method of making a two-phase material that comprises preparing a concrete mix with fibers of a material having a modulus of elasticity of at least about 20 million psi substantially uniformly distributed therein with an average spacing between fibers of up to about 0.3 inch, the improvement of providing the two-phase material with at least a preselected flexural strength by including and distributing the fibers in the mix in the specific quantity that the effective fiber bond area, $b$, is at least a predetermined value sufficient to provide the preselected flexural strength, and said $b$ is defined as the ratio of the surface area of the fibers intersecting the fracture plane normal to the stress at the known region of highest tensile stress to the area of the fracture plane with both areas expressed in the same units.

2. An improvement as in claim 1, wherein said ratio, $b$, is at least about $$\frac{1}{C}(U - U_o)$$

where
$U$ = the preselected ultimate flexural strength in said regions,
$U_o$ = the U intercept of an extension of a straight line plotting measured values of U's versus $b$'s, and
$C$ = the slope of said line.

3. An improvement as in claim 2, wherein the values of $U_o$ and C have been determined by measuring the ultimate flexural strengths for a plurality of substantially different values of the ratio, $b$, in test specimens of the two-phase material, plotting the improved values of U as a linear function of $b$ in rectangular coordinates, extending the plotting line to intercept the U axis to obtain $U_o$, and measuring the slope of the line to obtain C.

4. An improvement as in claim 1, wherein said ratio, $b$, is at least about $$\frac{1}{C}(F-f_o)$$

where
- $F$ = the preselected first crack flexural strength in said regions,
- $f_o$ = the F intercept of an extension of a straight line plotting measured values of F's versus $b$'s, and
- $C$ = the slope of said line.

5. An improvement as in claim 4, wherein the values of $f_o$ and C have been determined by measuring the first crack flexural strengths for a plurality of substantially different values of the ratio, $b$, in test specimens of the two-phase material, plotting the improved values of F as a linear function of $b$ in rectangular coordinates, extending the plotted line to intercept the F axis to obtain $f_o$, and measuring the slope of the line to obtain C.

6. An improvement as in claim 1, wherein the fibers are about $2.5 \times 10^{-5}$ to $3 \times 10^{-3}$ square inch in cross-sectional area and about ¼ to 3 inches long, and the average length is about 40 to 300 times the square root of the cross-sectional area.

7. An improvement as in claim 6, wherein the average length of the fibers is about 150 to 300 times the square root of the cross-sectional area.

8. An improvement as in claim 6, wherein the average length of the fibers is at least about 1 inch.

9. An improvement as in claim 8, wherein, with fibers of a given length and of a selected material and shape available in a plurality of cross-sectional areas, the fibers used have the cross-sectional area for which the product of the cost per unit weight times the square root of the cross-sectional area is least.

* * * * *